No. 853,178.  
PATENTED MAY 7, 1907.
M. KOTRASCHEK.  
SNOW SHOVEL AND WAGON.  
APPLICATION FILED AUG. 3, 1906.
3 SHEETS—SHEET 2.
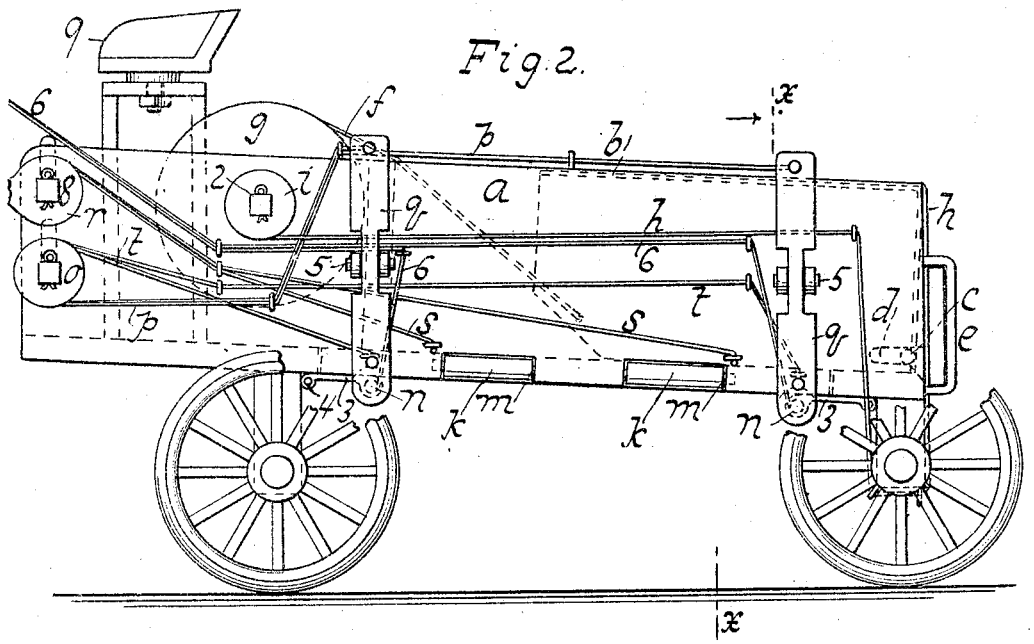
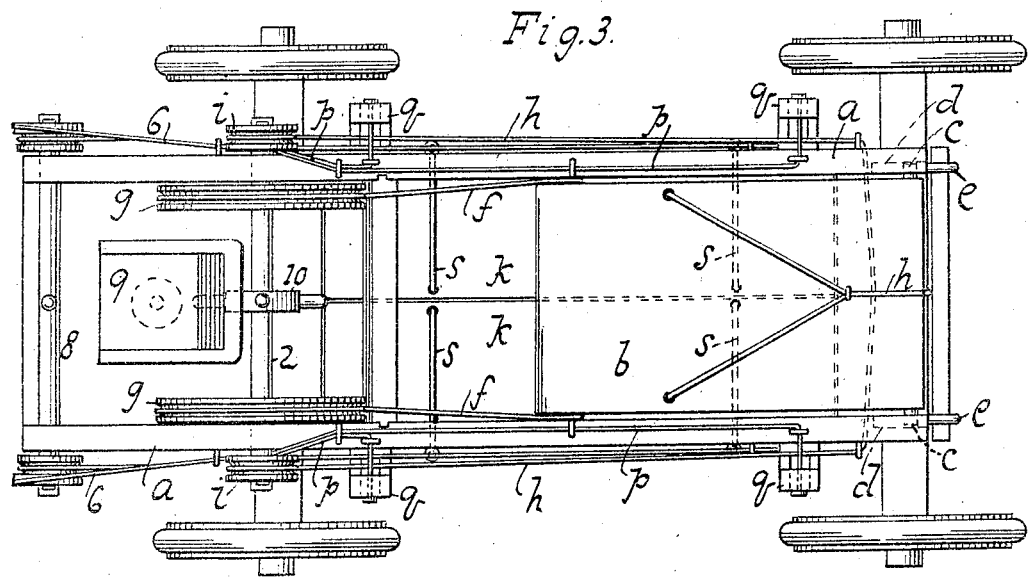
WITNESSES:  
William Miller  
George Hulsberg
INVENTOR  
Mathias Kotraschek  
BY  
W. C. Hauff  
ATTORNEY No. 853,178. PATENTED MAY 7, 1907.
M. KOTRASCHEK.
SNOW SHOVEL AND WAGON.
APPLICATION FILED AUG. 3, 1906.

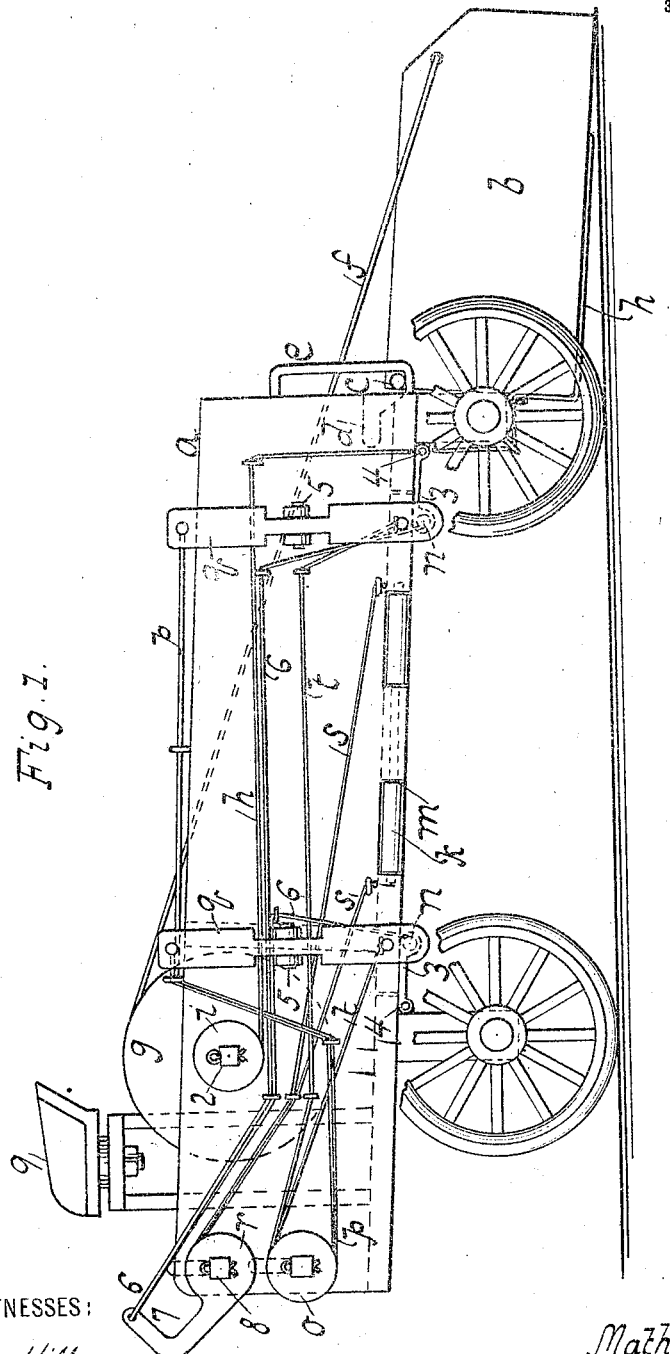

3 SHEETS—SHEET 3.

WITNESSES:
William Miller
George Hulsberg

INVENTOR
Mathias Kotraschek
BY
W. C. Hauff
ATTORNEY

UNITED STATES PATENT OFFICE.

MATHIAS KOTRASCHEK, OF NEW YORK, N. Y.

SNOW SHOVEL AND WAGON.

No. 853,178.  Specification of Letters Patent.  Patented May 7, 1907.

Application filed August 3, 1906. Serial No. 329,115.

*To all whom it may concern:*

Be it known that I, MATHIAS KOTRASCHEK, a citizen of the United States, residing at New York city, in the county and State of New York, have invented new and useful Improvements in Snow Shovels and Wagons, of which the following is a specification.

This invention relates to a wagon or vehicle for collecting snow or dirt or other matter and for dumping.

The device herein described provides a shoveling and dumping arrangement which can operate independently of the movement of the vehicle. The shovel is adapted to swing and slide so as to thoroughly discharge into the wagon.

Figure 4:
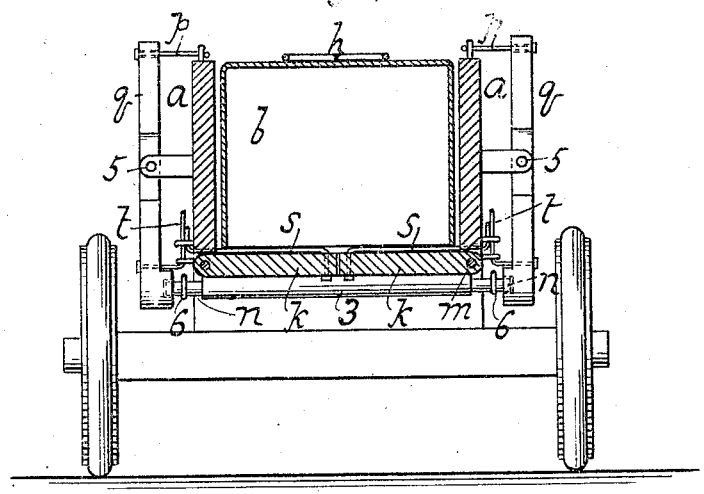
Figure 5:
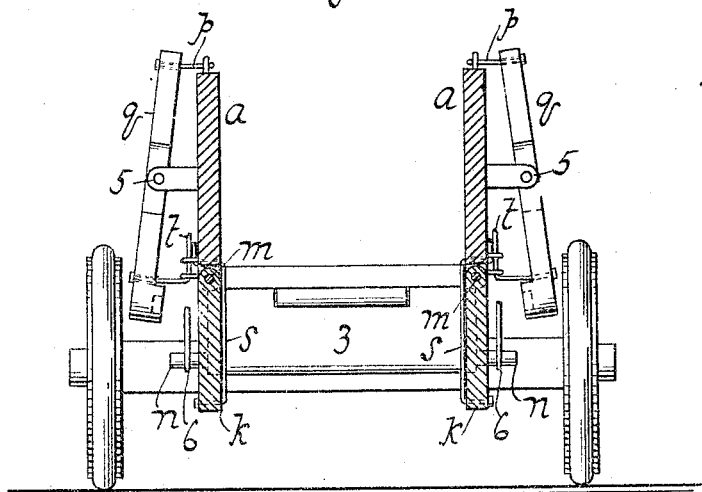

This invention is set forth in the following specification and claim and illustrated in the annexed drawing, in which:

Figure 1 is a side elevation of a device embodying this invention, the shovel being moved out. Fig. 2 is a view like Fig. 1 the shovel having been moved into the wagon or having emptied its contents into the wagon body. Fig. 3 is a plan view of Fig. 2. Fig. 4 is a section along $x$ $x$ Fig. 2, the bottom being closed. Fig. 5 shows the bottom being open.

In this drawing the body part of the wagon is shown at $a$. The shovel $b$ is connected to the wagon $a$ by hinge pin $c$ which can slide along guides or grooves $d$ in the sides of the wagon $a$ and swivel in loops or bent rods $e$ projecting at the tail part of the wagon $a$ and about which the shovel can swing as required to open or closed position as shown in Figs. 1 and 2. The shovel is pulled upon the wagon $a$ by a cord or wire pair $f$ of which each cord or wire $f$ is fastened to the outer or free end of the shovel and winds on a pulley $g$. The shovel is pulled out of the wagon by cord or wire $h$ which cord or wire $h$ is wound by pulley $i$. The pulleys are shown on a common shaft 2 and can be worked by hand, electric power or other means (not shown) which however is not essential. The bottom of this wagon is composed of flaps $k$ hinged respectively at $m$ to opposite sides of the wagon $a$. This bottom is shown held closed or its sections held up by bars $n$ on arms 3 hinged or pivoted at 4. These bars when holding the bottom closed or elevated are engaged or held by levers $q$ fulcrumed at 5. These levers are withdrawn by connections or cords $p$ wound about pulleys $o$. They are returned at the proper time as presently explained by cords $t$ wound about the pulleys $o$. The bars $n$ are raised or returned by cords or connections 6 connected to the free ends of arms 7 forming part of or extended from the shaft 8 of the pulleys $r$. The seat 9 of the driver or attendant is suitably swiveled so that the occupant can turn to face in any desired direction.

The operation is as follows: The parts being in the position shown in Fig. 2 the shaft 2 is rotated to cause the pulleys $i$ to wind or pull the cord or cord branches $h$. At the same time the pulleys $g$ slack or unwind the cords $f$. The shovel or scoop is now slid back and swung off the truck to the position shown in Fig. 1. Winding the shaft 2 the other way will slack the cord $h$ and cause the cords $f$ to be wound on pulleys $g$ and draw the shovel into the wagon bottom upward. Suitable spokes or hand wheel 10, Fig. 3, can be used to rotate shaft 2 with its pulleys in either direction. The driver having swiveled the seat 9 in the proper direction can remain thereon and turn the shaft or spokes. To dump or open the bottom the pulleys $o$ are rotated to pull on cords $p$ and swing the levers $q$ to the releasing position (Fig. 5). The supports $n$ are now freed and drop to release the bottom flaps which swing open. To close the bottom the shaft 8 is rotated to cause pulley $r$ to wind or actuate cords $s$ and pull up or close the bottom. At the same time arms 7 pull on cords 6 and raise up the bars or supports $n$. The pulleys $o$ are then rotated to pull on cords $t$ and bring levers $q$ back to engage or lock bars $n$ as seen in Fig. 4.

The shovel could be dismounted for repairs or to use the wagon temporarily for other purposes, for example to support a platform or seats. Suitable appliances as required for various kinds of work can also be supplied, as for example a derrick or the like.

The shovel and bottom with its locking device can be operated whether the wagon stands still or not. If the wagon is a motor wagon such motor can also be used to actuate the shovel and the other parts.

I claim:

1. The combination with a wagon having guides and loops, of a shovel or scoop adapted to slide along the guides and swing and move vertically at the loops, cords or connections for drawing the shovel out of and into the wagon and a shaft with pulleys for actuating the respective cords irrespective of the movements of the wagon.

2. The combination with a wagon having guides and loops fixed directly to the wagon of a shovel having its back portion hinged directly to and vertically movable in said loops, and means for moving the shovel out of the wagon to rest with its free edge on the ground facing away from the wagon, and means for swinging the free end of the shovel up and moving the shovel into the wagon.

In testimony whereof I have hereunto set my hand in the presence of two subscribing witnesses.

MATHIAS KOTRASCHEK.

Witnesses.
EDWARD WIESNER,
GEORGE HULSBERG.